(12) United States Patent
Brillon

(10) Patent No.: US 7,545,254 B2
(45) Date of Patent: Jun. 9, 2009

(54) METHOD AND DEVICE FOR PROTECTING A MOTOR VEHICLE

(75) Inventor: Alain Brillon, Villeneuve Tolosane (FR)

(73) Assignee: Continental Automotive France, Toulouse (FR)

( * ) Notice: Subject to any disclaimer, the term of this patent is extended or adjusted under 35 U.S.C. 154(b) by 597 days.

(21) Appl. No.: 11/272,828

(22) Filed: Nov. 15, 2005

(65) Prior Publication Data

US 2006/0125600 A1 Jun. 15, 2006

(30) Foreign Application Priority Data

Nov. 18, 2004 (FR) .................................. 04 12218

(51) Int. Cl.
*H04B 1/38* (2006.01)
(52) U.S. Cl. .................... 340/5.61; 340/5.72; 340/10.2
(58) Field of Classification Search ................. 340/5.61
See application file for complete search history.

(56) References Cited

U.S. PATENT DOCUMENTS

| | | | |
|---|---|---|---|
| 6,208,239 B1 * | 3/2001 | Muller et al. | 340/426.35 |
| 6,218,932 B1 * | 4/2001 | Stippler | 340/426.16 |
| 2001/0028296 A1 * | 10/2001 | Masudaya | 340/5.61 |
| 2001/0033222 A1 * | 10/2001 | Nowottnick et al. | 340/5.61 |
| 2002/0033752 A1 * | 3/2002 | Greenwood et al. | 341/5.61 |
| 2003/0119453 A1 | 6/2003 | Blatz et al. | |

FOREIGN PATENT DOCUMENTS

| | | |
|---|---|---|
| EP | 1 143 091 | 10/2001 |
| EP | 1 403 653 | 3/2004 |

* cited by examiner

*Primary Examiner*—Daniel Wu
*Assistant Examiner*—Brian Wilson
(74) *Attorney, Agent, or Firm*—Young & Thompson

(57) ABSTRACT

In a method for protecting a motor vehicle, the vehicle is equipped with antennas such that each zone of the cabin is covered by at least two antennas, and with an electronic tag furnished with a device measuring three-dimensional orientation of the magnetic fields received by the electronic tag. A sequence of emissions that consists of a succession of magnetic fields emitted in succession in a given random order from the antennas of the vehicle is randomly determined. After the tag receives this magnetic field succession, a check is carried out to verify that the random emission order has indeed been complied with and that the orientation of the fields that is received by the tag conforms to the expected random orientation. Additionally, the amplitude of the fields can be randomly varied. Authorization to start the vehicle is granted if this random variation is actually received by the tag.

20 Claims, 2 Drawing Sheets

METHOD AND DEVICE FOR PROTECTING A MOTOR VEHICLE

The invention relates to a method and device for protecting a motor vehicle, that are adapted for authorizing the starting of this vehicle only after a prior identification of a specific electronic tag situated inside the cabin of the said motor vehicle.

BACKGROUND OF THE INVENTION

Devices for protecting motor vehicles usually referred to as electronic anti-starting systems, comprise a central unit mounted on the vehicle comprising a transmitter/receiver circuit associated with antennas adapted to cover the entire volume of the cabin, and a tag carried by an authorized person, the said central unit and the electronic tag being programmed in such a way as to implement an authorization procedure according to which the central unit instructs the emission of an identification request signal on receipt of which the electronic tag is adapted to transmit in response an identification signal identifiable by the said central unit.

One of the advantages of such protection devices resides in the elimination of the key conventionally used to undertake the starting of the vehicle, which is replaced with an electronic tag simply carried by an authorized person.

However, against this advantage, these protection devices constitute a weak point in terms of security against the theft of the vehicles. Specifically, by virtue of their very design, they require that a middle-distance bi-directional dialogue be instigated between the vehicle and the electronic tag, instead of the short-distance dialogue instigated between a conventional key and an antenna disposed on an antitheft contactor. However, an increase in distance such as this is equivalent to offering the possibility of installing, between the vehicle and the electronic tag, a radio relay undetectable by the protection device, allowing recognition of the electronic tag at very long distance. Stated otherwise, on account of this increase in distance, it turns out to be possible for a malicious person to undertake the starting of the vehicle without being in possession of the electronic tag.

With a view to alleviating this drawback, a current solution consists in varying the field level and/or the orientation of the magnetic field emitted by the central unit of the vehicle destined for the electronic tag, and in programming this tag in such a way that it conditions the emission of an authorization to start on the prior detection of a variation of the magnetic field received.

However, once this principle of protection is known, it turns out to be easily reproducible; specifically, the amplitude of the programmed variation may not be measured absolutely, and it therefore suffices to design a radio relay able to reproduce an alteration in the magnetic field, amplitude or orientation, consisting of a simple image of the programmed variation of the magnetic field.

The present invention aims to alleviate this drawback and its main objective is to provide a method and a device for protection offering very elevated conditions of tamper-proofing in relation to a possible hijacking attempt.

SUMMARY OF THE INVENTION

For this purpose, the invention is aimed at a method of protecting a motor vehicle, the said method consisting:

in equipping the vehicle with a central unit comprising a transmitter/receiver circuit associated with antennas adapted for covering the entire volume of the cabin, and in programming the central unit and an electronic tag in such a way as to implement an authorization procedure according to which the central unit instructs the transmission of an identification request signal on receipt of which the electronic tag is adapted for transmitting in response an identification signal identifiable by the said central unit.

According to the invention, this method is characterized in that:

the vehicle is equipped with a plurality of antennas disposed and adapted so that each zone of the cabin is covered by at least two antennas, and the electronic tag is equipped with means of three-dimensional measurement of the orientation of the magnetic fields received by the said electronic tag, and an authorization procedure is programmed, said procedure consisting:

in determining in a random manner a sequence of emissions which consists of a succession of magnetic fields to be emitted one after the other in a given order from the antennas of the vehicle, in sending to the electronic tag a signal representative of the randomly determined sequence of emissions, in instructing the successive emission by the antennas of the vehicle of the magnetic fields forming the sequence of emissions, upon receipt of the successive magnetic fields by the electronic tag, in measuring, for each of the said magnetic fields, a value representative of the resulting orientation of the said electronic tag with respect to the source of emission of this magnetic field, in such a way as to establish a series of values each representative of the measured resulting orientation, and in comparing the randomly determined sequence of emissions with the series of measured values, and in validating the authorization procedure upon a correlation between the said sequence of emissions and series of values.

The invention therefore consists in instigating an authorization procedure according to which an identification request signal is generated, consisting of a randomly determined and hence unpredictable sequence of emissions, on receipt of which the electronic tag is programmed to establish a series of measured values, whose correlation with the sequence of emissions subsequently constitutes the condition of validation of the authorization procedure.

According to this method, the mere fact of randomly determining a sequence of emissions during each authorization procedure leads to precluding any possibility of prediction and hence of hijacking of the said sequence.

On account of this unpredictable nature of the sequences, a hijacker would in fact be obliged to detect the successive magnetic fields emitted by the central unit of the vehicle by means of three antennas (one per dimension), then to reproduce these magnetic fields in proximity to the electronic tag with several antennas (normally three). In practice, such a hijacking operation turns out to be, if not impossible, at the very least highly problematic to implement, having regard in particular, and as stated above, to the nonrepetitive nature of the sequences of emissions.

According to an advantageous embodiment of the invention the electronic tag is equipped with means of measurement of the amplitude of the magnetic fields received by the said electronic tag and an authorization procedure is programmed, which procedure consists:

upon receipt of the successive magnetic fields by the electronic tag, in measuring, for each of the said magnetic fields, a value representative of the amplitude of the said magnetic field, so as to establish, in addition to the series of values each representative of the measured resulting orientation, a second series of values each representative of the measured amplitude and in comparing the randomly determined sequence of emissions with each of the two series of measured values, and in validating the authorization procedure upon a correlation between the said sequences of emissions and two series of values.

This mode of implementation which leads to the imposition of a double correlation with a view to validating the authorization procedure, makes it possible to reduce to the utmost the risks of erroneous validation of an electronic tag, and to render any hijacking attempt yet more complex.

Moreover, advantageously according to the invention, each antenna of the vehicle is equipped with means of adjusting the amplitude of the magnetic field emitted by the said antenna, in such a way as to make it possible to instruct the emission by each antenna of magnetic fields of different amplitudes upon one and the same sequence of emissions.

According to another advantageous mode of implementation of the invention, the electronic tag is programmed so as to establish the two series of measured values representative of the resulting orientation and of the amplitude of each magnetic field received, and so as to emit an identification signal in response representative of the said series of measured values, the central unit of the vehicle being programmed, on receipt of the said identification signal, to compare the randomly determined sequence of emissions with the series of measured values, and to validate the authorization procedure upon a correlation between the said sequence of emissions and series of values.

Thus the processing of the values measured aimed in particular at establishing any correlations is carried out by the central unit of the vehicle and therefore benefits from the calculational power of this central unit.

As a variant, however, the processing and the comparison of the emission sequences and of the series of measured values may be carried out in the tag. Thus this processing and this comparison are performed interchangeably by the tag and/or by the central unit.

Additionally, advantageously according to the invention, upon the detection of an electronic tag inside the cabin of a vehicle, a prior procedure for identifying the antennas of the vehicle is programmed, the emission of which is received by the said electronic tag, so as to program an authorization procedure consisting in determining the sequence of emissions by using only the vehicle's antennas identified during this prior procedure. This prior selection of only the antennas that are "active" in relation to the electronic tag leads, in fact, to a reduction in the time necessary for the implementation of the authorization procedure and renders it more effective.

Moreover, in order to guarantee perfect coverage by at least two antennas of each zone of the cabin, the vehicle is advantageously equipped with antennas disposed respectively outside the cabin at the level of openable panels for access to this cabin, and inside the said cabin and distributed within the latter.

The invention extends to a device for protecting a motor vehicle, adapted for authorizing the starting of this vehicle only after a prior identification of a specific electronic tag situated inside the cabin of the said motor vehicle, the said protection device comprising a central unit mounted on the vehicle and comprising a transmitter/receiver circuit associated with antennas adapted for covering the entire volume of the cabin, the said central unit and the electronic tag being programmed in such a way as to implement an authorization procedure according to which the central unit instructs the transmission of an identification request signal on receipt of which the electronic tag is adapted for transmitting in response an identification signal identifiable by the said central unit.

According to the invention, this device for protection is characterized in that:

the antennas associated with the central unit are disposed and adapted so that each zone of the cabin is covered by at least two antennas, the electronic tag comprises means of three-dimensional measurement of the orientation of the magnetic fields received by the said electronic tag, and the central unit and the electronic tag are programmed to implement an authorization procedure consisting:

in determining in a random manner a sequence of emissions which consists of a succession of magnetic fields to be emitted one after the other in a given order from the antennas of the vehicle, in sending to the electronic tag a signal representative of the randomly determined sequence of emissions, in instructing the successive emission by the antennas of the vehicle of the magnetic fields forming the sequence of emissions, upon receipt of the successive magnetic fields by the electronic tag, in measuring, for each of the said magnetic fields, a value representative of the resulting orientation of the said electronic tag with respect to the source of emission of this magnetic field, in such a way as to establish a series of values each representative of the measured resulting orientation, and in comparing the randomly determined sequence of emissions with the series of measured values, and in validating the authorization procedure upon a correlation between the said sequence of emissions and series of values.

Moreover, according to an advantageous embodiment of this protection device, and according to the invention:

the electronic tag comprises means of measurement of the amplitude of the magnetic fields received by the said electronic tag, and the central unit and the electronic tag are programmed to implement an authorization procedure consisting:

upon receipt of the successive magnetic fields by the electronic tag, in measuring, for each of the said magnetic fields, a value representative of the amplitude of the said magnetic field, so as to establish, in addition to the series of values each representative of the measured resulting orientation, a second series of values each representative of the measured amplitude, and in comparing the randomly determined sequence of emissions with each of the two series of measured values, and in validating the authorization procedure upon a correlation between the said sequence of emissions and two series of values.

Additionally, advantageously and according to the invention, each antenna of the vehicle is equipped with means of adjusting the amplitude of the magnetic field emitted by the said antenna, in such a way as to make it possible to instruct the emission by each antenna of magnetic fields of different amplitudes upon one and the same sequence of emissions.

Moreover, the antennas associated with the central unit are advantageously disposed respectively outside the cabin at the level of openable panels for access to this cabin, and inside the said cabin and distributed within the latter.

BRIEF DESCRIPTION OF THE DRAWINGS

Other characteristics, aims and advantages of the invention will emerge from the detailed description which follows with reference to the appended drawings which by way of nonlimiting example represent a preferred embodiment thereof. In these drawings:

FIG. 2b is a schematic representative of the amplitudes of the signals received by the electronic tag during the sequence of emissions represented in FIG. 2a, and FIG. 2c is a schematic representative of the resulting orientations of the signals received by the electronic tag during the sequence of emissions represented in FIG. 2a.

DETAILED DESCRIPTION OF THE PREFERRED EMBODIMENTS

Figure 1:
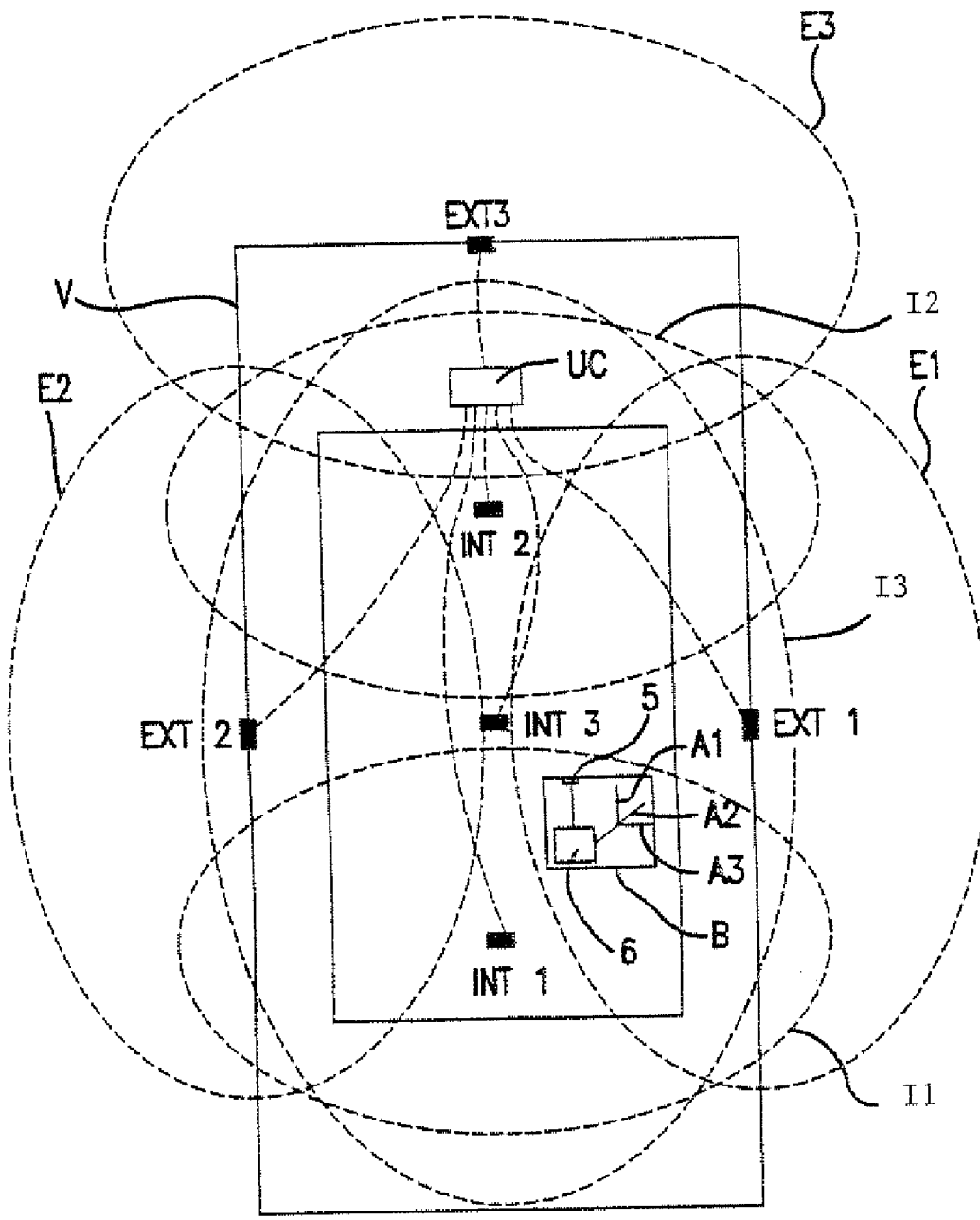
FIG. 1 is a diagrammatic view from above of a motor vehicle equipped with a protection device according to the invention fitted with antennas whose coverage zones are demarcated in this figure.

The device according to the invention represented by way of example in FIG. 1 equipping a vehicle V is a device usually known as a "hands free device", adapted for making it possible to access the vehicle V and to start the latter by virtue of the identification of an electronic tag B.

This hands free device comprises, firstly, six antennas consisting of three exterior antennas EXT1, EXT2, EXT3 disposed outside the cabin, and of three interior antennas INT1, INT2, INT3 disposed in the cabin. Of course, the number of external and internal antennas could be different from three, without departing from the scope of the invention. By way of illustration, the zones of coverage of these antennas EXT1-EXT3 and INT1-INT3 are demarcated in ovoid form in FIG. 1.

In conventional manner, the exterior antennas are mounted on the handles of doors for access to the vehicle V: two antennas EXT1, EXT2 on the respective handles of two opposite side doors of the vehicle, and an antenna EXT3 on the rear door for access to the boot of the vehicle V.

Moreover, the two antennas of the side doors EXT1 and EXT2 are oriented in such a way that their respective zone of coverage E1 and E2 exhibits a major longitudinal axis, that is to say an axis parallel to the length of the vehicle V.

The exterior antenna EXT3 mounted on the rear door is for its part oriented in such a way that its zone of coverage E3 exhibits a major transverse axis, that is to say an axis orthogonal to the length of the vehicle V.

Furthermore, these three exterior antennas EXT1-EXT3 are disposed in such a way that their zone of coverage E1-E3 extends halfway inside the cabin.

The interior antennas INT1, INT2, INT3 are for their part distributed inside the cabin of the vehicle V and consist, as represented in FIG. 1 of:

two end antennas INT1, INT2 oriented and disposed in such a way as to possess zones of coverage I1, I2 exhibiting a major transverse axis, respectively covering front and rear portions of the surface of the cabin, and an intermediate antenna INT3 oriented and disposed in such a way as to possess a zone of coverage I3 exhibiting a major longitudinal axis, covering substantially the entire surface of the cabin.

As represented in FIG. 1 by the demarcation of the respective zones of coverage E1-E1, I1-I3 of the six antennas EXT1-EXT3, INT1-INT3, this disposition of the said six antennas makes it possible to obtain a coverage by at least two antennas of each zone of the cabin.

The hands free device according to the invention furthermore comprises, mounted on the vehicle V, a central unit UC fitted with a computer integrating a radio frequency transmitter/receiver circuit connected to the six antennas EXT1-EXT3, INT1-INT3, and comprising amplifiers adapted for making it possible to individually adjust the level of the magnetic field emitted by each of the said antennas.

The hands free device according to the invention additionally comprises, as mentioned above, an electronic tag B intended to be carried by a user of the vehicle V.

This electronic tag B comprises a computer 6 integrating a radio frequency transmitter/receiver circuit;

connected to three antennas A1, A2, A3 oriented along orthogonal axes, so as to allow a three-dimensional measurement of the orientation of the magnetic fields received by the electronic tag B, comprising an output 5 of RSSI type ("Receiver Signal Strength Indicator"), able to allow the analysis of the level of the field received by the said transmitter/receiver circuit, this analysis function being managed by the computer 6 by means of an analog/digital port for the said RSSI output 5.

With a view to the implementation of the method according to the invention, the two respective computers of the central unit UC of the electronic tag B are, firstly, programmed so as to perform, upon the detection of an electronic tag B inside the cabin of a vehicle V, a prior procedure of identification and selection of the antennas INT1-INT3, EXT1-EXT3 of the said vehicle whose emission is received by the said electronic tag.

These two computers are subsequently programmed to commence the electronic tag B identification procedure intended to validate or otherwise the authorization to start the vehicle V.

According to this procedure, the central unit UC is programmed, firstly, so as to randomly determine a sequence of emissions that consists of a succession of magnetic fields to be emitted one after the other in a given order from the previously selected antennas INT1-INT3, EXT1-EXT3 of the vehicle V, and whose emission is therefore received by the electronic tag B.

The following two steps are instructed by the central unit UC and consist respectively:

in sending the electronic tag B a signal representative of the randomly determined sequence of emissions, then instructing the successive emission by the previously selected antennas INT1-INT3, EXT1-EXT3 of the vehicle V, of the magnetic fields forming the sequence of emissions.

Upon receipt of these successive magnetic fields, the electronic tag B is for its part programmed to measure, for each of the said magnetic fields:

on the one hand, a value representative of the resulting orientation of the said electronic tag with respect to the source of emission of this magnetic field, so as to establish a series of values each representative of the measured resulting orientation, and on the other hand, a value representative of the amplitude of this magnetic field, so as to establish a second series of values each representative of the measured amplitude.

The last step consists, finally, in comparing the randomly determined sequence of emissions with each of the series of measured values, so as to validate the authorization procedure upon a correlation between the said sequence of emissions and each of the said series of measured values.

It should be noted that the latter processing may be performed directly by the computer 6 of the electronic tag B. It may also be performed by the central unit UC with a view to benefiting from the calculational power of the latter, utilizing the prior emission by the electronic tag B, destined for the said central unit, of an identification signal in response, representative of the two series of measured values.

Figure 2A:
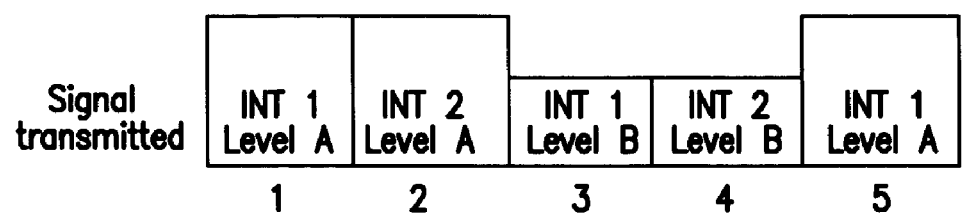
FIG. 2a is a schematic representative of a sequence of emissions emitted according to the invention from two antennas of the vehicle.

FIG. 2a represents an exemplary sequence of magnetic fields emitted according to the invention from two antennas such as INT1 and INT2 of a vehicle V.

According to this example, each of the antennas INT1 and INT2 emits magnetic fields of respective amplitudes A and B, such that the amplitude A is double the amplitude B, and the sequence consists of five successive magnetic fields consisting respectively, in their order of emission, of:
1—a magnetic field of amplitude A emitted by antenna INT1,
2—a magnetic field of amplitude A emitted by antenna INT2,
3—a magnetic field of amplitude B emitted by antenna INT1,
4—a magnetic field of amplitude B emitted by antenna INT2,
5—a magnetic field of amplitude A emitted by antenna INT1.

Figure 2B:
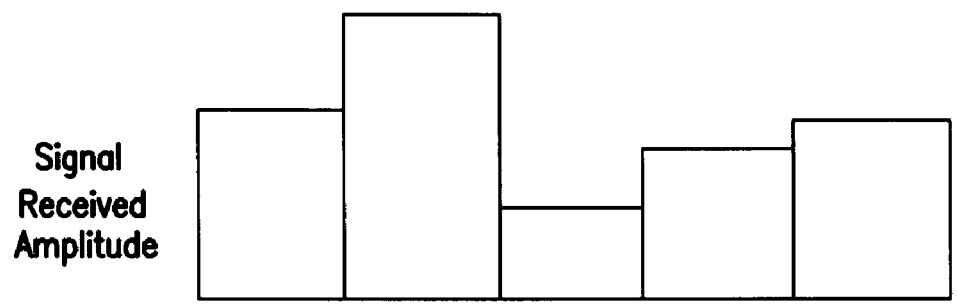
Figure 2C:
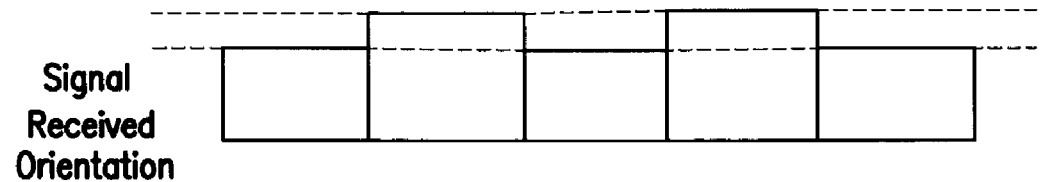

FIGS. 2b and 2c represent the series of values measured by the electronic tag on receipt of the aforesaid sequence of emissions, and consisting of a series of values representative of the measured amplitude (FIG. 2b), and of a series of values representative of the measured resulting orientation (FIG. 2c).

According to the method of the invention, the processing consisting in comparing the sequence of emissions with the two series of values measured by the electronic tag B, leads to the validation of the authorization procedure if the following correlation criteria are complied with:
amplitude of field 1=amplitude of field 5,
amplitude of field 2=amplitude of field 4, multiplied by two,
amplitude of field 1=amplitude of field 3, multiplied by two,
resulting orientations of fields 1, 3 and 5 identical,
resulting orientations of fields 2 and 4 identical,
and orientation of field 1 different from that of field 2.

The method according to the invention as described hereinabove therefore constitutes a very effective "weapon" for combating the risks of hijacking of hands free devices for starting a motor vehicle.

Of course, this method is not limited to the fields amplitude and orientation sequence described, nor even to the use of three internal and external antennas. Any sequence is possible combining or otherwise variations of amplitude and variations of orientation of fields.

The invention claimed is:

1. A method of protecting a motor vehicle (V), adapted for authorizing a starting of the vehicle only after a prior identification of a specific electronic tag (B) fitted with a transmitter/receiver circuit (6), situated inside a cabin of the motor vehicle, the method comprising the steps of:
equipping the vehicle (V) with a central unit (UC) comprising a transmitter/receiver circuit associated with a plurality of antennas (INT1-INT3, EXT1-EXT3) adapted for covering an entire volume of the cabin, and
configuring the central unit (UC) and the electronic tag (B) to implement an authorization procedure such that the central unit (UC) instructs the transmission of an identification request signal, and upon receipt of the identification request signal at the electronic tag, the electronic tag (B) is configured to transmit, in response, an identification signal identifiable by the central unit, wherein,
the vehicle (V) has antennas (INT1-INT3, EXT1-EXT3) disposed and configured such that each zone of the cabin is covered by at least two of the antennas,
the electronic tag (B) has means of three-dimensional measurement (A1-A3) of an orientation of magnetic fields received by the electronic tag, and
the central unit and the electronic tag are configured to perform an authorization procedure, the authorization procedure comprised of the steps of:
determining a random sequence of emissions comprised of at least a first magnetic field emitted from a first of the antennas succeeded by a second magnetic field emitted from a second of the antennas, said first antenna and said second antenna determined randomly from the antennas (INT1-INT3, EXT1-EXT3) of the vehicle (V),
sending to the electronic tag (B) a signal representative of the randomly determined sequence of emissions,
instructing the antennas (INT1-INT3, EXT1-EXT3) to emit the succession of magnetic fields, forming the randomly determined sequence of emissions,
upon receipt of the succession of magnetic fields by the electronic tag (B), measuring each of the magnetic fields to determine an orientation value representative of a resulting orientation of the electronic tag with respect to a source of emission of the magnetic field, thereby to establish a series of orientation values, each orientation value being representative of the resulting orientation,
comparing the randomly determined sequence of emissions with the series of orientation values, and
validating the authorization procedure upon determination of a correlation between the randomly determined sequence of emissions and the series of orientation values.

2. The method of protection according to claim 1, wherein,
the electronic tag (B) also has means (5) of measurement of an amplitude of each of the magnetic fields received by the electronic tag, and
the authorization procedure further comprises the steps of:
upon receipt of the succession of magnetic fields by the electronic tag (B), measuring, for each of the magnetic fields, an amplitude value representative of an amplitude of the magnetic field, so as to establish a series of amplitude values, each amplitude value being representative of the amplitude,
comparing the randomly determined sequence of emissions with the series of amplitude values, and
further validating the authorization procedure upon determination of a correlation between the randomly determined sequence of emissions and the series of amplitude values.

3. The method of protection according to claim 2, wherein each of the antennas (INT1-INT3, EXT1-EXT3) of the vehicle (V) is equipped with means of adjusting the amplitude of the magnetic field emitted by the antenna.

4. The method of protection according to claim 3,
wherein the electronic tag (B) is configured to establish the series of orientation values and the series of amplitude values, and to emit the identification signal in response to randomly determined sequence of emissions, the identification signal being representative of the series of orientation values, and wherein the central unit (UC) of the vehicle (V) is configured to, on receipt of the identification signal, compare the sequence of emissions with the series of orientation values, and also to validate the authorization procedure upon determination of a correlation between the randomly determined sequence of emissions and the series of orientation values.

5. The method of protection according to claim 1 further comprising the steps of:
detecting the electronic tag (B) inside the cabin of the vehicle (V); and
upon detection of the electronic tag inside the cabin, receiving, at the electronic tag, a programming emission from an active subgroup of the antennas (INT1-TNT3, EXT1-EXT3) of the vehicle to identity each antenna of the active subgroup to the electronic tag,
wherein the authorization procedure determines the randomly determined sequence of emissions using only the active subgroup antennas identified during the receiving step.

6. The method of protection according to claim 1,
wherein a first subset (EXT1-EXT3) of the antennas (INT1-INT3, EXT1-EXT3) are disposed outside the cabin at a level of openable panels of the vehicle for access to the cabin, and
wherein a second subset (INT1-INT3) of the antennas (INT1-INT3), EXT1-EXT3) are disposed inside the cabin and distributed within the cabin.

7. The method of protection according to claim 1, the electronic tag and the central unit are configured to process and compare the randomly determined sequence of emissions and the series of orientation values interchangeably.

8. A device for protecting a motor vehicle (V), situated inside a cabin of the motor vehicle and configured to authorize a starting of the vehicle, the device comprising:
an electronic tag fitted with a transmitter/receiver circuit (6);
antennas (INT1-INT3, EXT1-EXT3) adapted for covering the entire volume of the cabin; and
a central unit (UC) mounted on the vehicle (V), comprised of a transmitter/receiver circuit associated with the antennas (INT1-INT3, EXT1-EXT3),
wherein the central unit and the electronic tag (B) are configured to implement an authorization procedure, the authorization procedure causing the central unit (UC) to instruct the transmission of an identification request signal and, upon receipt of the identification request signal, the electronic tag (B) is configured to transmit in response an identification signal identifiable by the central unit,
wherein the antennas (INT1-INT3, EXT1-EXT3) are associated with the central unit (UC), and are disposed and adapted so that each zone of the cabin is covered by at least two of the antennas,
wherein the electronic tag (B) comprises means of three-dimensional measurement (A1-A3) of an orientation of magnetic fields received by the electronic tag, and
wherein the central unit (UC) and the electronic tag (B) are configured to implement an authorization procedure comprised of the steps of:

determining a random sequence of emissions comprised of at least a first magnetic field emitted from a first of the antennas succeeded by a second magnetic field emitted from a second of the antennas, said first antenna and said second antenna determined randomly from the antennas (INT1-INT3, EXT1-EXT3) of the vehicle (V),
sending to the electronic tag (B) a signal representative of the randomly determined sequence of emissions,
instructing The antennas (INT1-INT3, EXT1-EXT3) to emit the succession of magnetic fields, forming the randomly determined sequence of emissions,
upon receipt of the succession of magnetic fields by the electronic tag (B), measuring each of the magnetic fields to determine an orientation value representative of a resulting orientation of the electronic tag with respect to the source of emission of the magnetic field, thereby to establish a series of orientation values, each of the orientation values representative of the resulting orientation,
comparing the randomly determined sequence of emissions with the series of orientation values, and
validating the authorization procedure upon determination of a correlation between the randomly determined sequence of emissions and the series of orientation values.

9. The device for protection according to claim 8, wherein, the electronic tag (B) further comprises means (5) of measurement of an amplitude of each of the magnetic fields received by the electronic tag, and
the authorization procedure of the central unit (UC) and the electronic tag (B) further comprises the steps of:
upon receipt of the succession of magnetic fields by the electronic tag (B), measuring, for each of the magnetic fields, an amplitude value representative of an amplitude of the magnetic field, so as to establish, a series of amplitude values each amplitude value being representative of the amplitude,
comparing the sequence of emissions with each of the series of amplitude values, and
further validating the authorization procedure upon determination of a correlation between the randomly determined sequence of emissions and the series of amplitude values.

10. The device of protection according to claim 9, wherein each of the antennas (INT1-INT3, EXT1-EXT3) of the vehicle (V) is equipped with means of adjusting the amplitude of the magnetic field emitted by the antenna.

11. The device for protection according to claim 8,
wherein a first subset (EXT1-EXT3) of the antennas (INT1- INT3, EXT1-EXT3) are disposed outside the cabin at a level of openable panels of the vehicle for access to the cabin, and
wherein a second subset (INT1-INT3) of the antennas (INT1-INT3, EXT1-EXT3) are disposed inside the cabin and distributed within the cabin.

12. The method of protection according to claim 2, further comprising the steps of:
detecting the electronic tag (B) inside the cabin of the vehicle (V); and
upon detection of the electronic tag inside the cabin, receiving, at the electronic tag, a programming emission from an active subgroup of the antennas (INT1-INT3, EXT1-EXT3) of the vehicle to identify each antenna of the active subgroup to the electronic tag, wherein the authorization procedure determines the randomly determined sequence of emissions using only the active subgroup antennas identified during the receiving step.

13. The method of protection according to claim 3, further comprising the steps of:
    detecting the electronic tag (B) inside the cabin of the vehicle (V); and
    upon detection of the electronic tag inside the cabin, receiving, at the electronic tag, a programming emission from an active subgroup of the antennas (INT1-INT3, EXT1-EXT3) of the vehicle to identify each antenna of the active subgroup to the electronic tag,
    wherein the authorization procedure determines the randomly determined sequence of emissions using only the active subgroup antennas identified during the receiving step.

14. The method of protection according to claim 4, further comprising the steps of:
    detecting the electronic tag (B) inside the cabin of the vehicle (V); and
    upon detection of the electronic tag inside the cabin, receiving, at the electronic tag, a programming emission from an active subgroup of the antennas (INT1-INT3, EXT1-EXT3) of the vehicle to identify each antenna of the active subgroup to the electronic tag,
    wherein the authorization procedure determines the randomly determined sequence of emissions using only the active subgroup antennas identified during the receiving step.

15. The method of protection according to claim 2,
    wherein a first subset (EXT1-EXT3) of the antennas (INT1-INT3, EXT1-EXT3) are disposed outside the cabin at a level of openable panels of the vehicle for access to the cabin, and
    wherein a second subset of the antennas (INT1-INT3) are disposed inside the cabin and distributed within the cabin.

16. The method of protection according to claim 3,
    wherein a first subset (EXT1-EXT3) of the antennas (INT1-INT3, EXT1-EXT3) are disposed outside the cabin at a level of openable panels of the vehicle for access to the cabin, and
    wherein a second subset of the antennas (INT1-INT3) are disposed inside the cabin and distributed within the cabin.

17. The method of protection according to claim 4,
    wherein a first subset (EXT1-EXT3) of the antennas (INT1-INT3, EXT1-EXT3) are disposed outside the cabin at a level of openable panels of the vehicle for access to the cabin, and
    wherein a second subset of the antennas (INT1-INT3) are disposed inside the cabin and distributed within the cabin.

18. The method of protection according to claim 5,
    wherein a first subset (EXT1-EXT3) of the antennas (INT1-INT3, EXT1-EXT3) are disposed outside the cabin at a level of openable panels of the vehicle for access to the cabin, and
    wherein a second subset of the antennas (INT1-INT3) are disposed inside the cabin and distributed within the cabin.

19. The method of protection according to claim 2, wherein the electronic tag and the central unit are configured to process and compare the randomly determined sequence of emissions and the series of orientation values interchangeably.

20. The method of protection according to claim 3, wherein the electronic tag and the central unit are configured to process and compare the randomly determined sequence of emissions and of the series of orientation values interchangeably.

* * * * *